(12) United States Patent
Irie et al.

(10) Patent No.: US 12,300,427 B2
(45) Date of Patent: May 13, 2025

(54) SYSTEM-ON-CHIP WITH A PLURALITY OF CHIPS COMMUNICATING WIRELESSLY USING HORIZONTAL INDUCTIVE COUPLING

(71) Applicant: THE UNIVERSITY OF TOKYO, Tokyo (JP)

(72) Inventors: Hidetsugu Irie, Tokyo (JP); Junichiro Kadomoto, Tokyo (JP); Shuichi Sakai, Tokyo (JP)

(73) Assignee: THE UNIVERSITY OF TOKYO (JP)

( * ) Notice: Subject to any disclaimer, the term of this patent is extended or adjusted under 35 U.S.C. 154(b) by 229 days.

(21) Appl. No.: 17/778,091

(22) PCT Filed: Nov. 20, 2020

(86) PCT No.: PCT/JP2020/043363
§ 371 (c)(1),
(2) Date: May 19, 2022

(87) PCT Pub. No.: WO2021/106777
PCT Pub. Date: Jun. 3, 2021

(65) Prior Publication Data
US 2022/0415569 A1  Dec. 29, 2022

(30) Foreign Application Priority Data

Nov. 26, 2019  (JP) .................................. 2019-212966

(51) Int. Cl.
*G06F 15/78* (2006.01)
*H01F 38/14* (2006.01)

(52) U.S. Cl.
CPC ......... *H01F 38/14* (2013.01); *G06F 15/7807* (2013.01); *H01F 2038/143* (2013.01)

(58) Field of Classification Search
CPC ....................... G06F 15/7807; H01F 2038/143
See application file for complete search history.

(56) References Cited

U.S. PATENT DOCUMENTS 4,857,893 A * 8/1989 Carroll ..................... H01Q 9/27
340/10.52
6,925,627 B1 * 8/2005 Longway .............. G06F 30/394
257/207

(Continued)

FOREIGN PATENT DOCUMENTS

JP      2004-145453 A    5/2004
JP      2010-283817 A   12/2010

(Continued)

OTHER PUBLICATIONS

Office Action issued in the corresponding Japanese Patent Application No. 2022-192650; mailed on Sep. 26, 2023 (total 10 pages).

(Continued)

*Primary Examiner* — Jacob Petranek
(74) *Attorney, Agent, or Firm* — Harness, Dickey & Pierce, P.L.C.

(57) ABSTRACT

An information processing device is provided that can more flexibly adapt to changes in shape and mounting configuration. The information processing device has a plurality of chips that are integrated in the horizontal direction. A transmission coil and reception coil pair is formed in each of (Continued)

the plurality of chips, and each of the plurality of chips uses horizontal inductive coupling to achieve wireless connection between the chips.

20 Claims, 30 Drawing Sheets

(56) References Cited

U.S. PATENT DOCUMENTS

| | | | |
|---|---|---|---|
| 9,070,066 | B1 | 6/2015 | Oliver et al. |
| 2010/0020448 | A1 | 1/2010 | Ng et al. |
| 2010/0102421 | A1* | 4/2010 | Chang .................. H01L 23/585 |
| | | | 257/659 |
| 2010/0324756 | A1* | 12/2010 | Fletcher ............. G05B 19/0421 |
| | | | 701/1 |
| 2011/0033668 | A1* | 2/2011 | Boelstler ............... B32B 27/304 |
| | | | 156/60 |
| 2011/0090253 | A1* | 4/2011 | Good ..................... G06V 30/15 |
| | | | 345/633 |
| 2011/0185091 | A1* | 7/2011 | Rofougaran ......... H04B 5/0037 |
| | | | 710/106 |
| 2012/0062040 | A1* | 3/2012 | Kaeriyama ......... H01L 23/5227 |
| | | | 307/104 |
| 2014/0244870 | A1* | 8/2014 | Cordeiro ................ G06F 13/42 |
| | | | 710/106 |
| 2015/0145742 | A1 | 5/2015 | Cao |
| 2017/0092603 | A1 | 3/2017 | Kuroda |
| 2020/0064158 | A1* | 2/2020 | Lee ........................ G01D 11/30 |

FOREIGN PATENT DOCUMENTS

| | | |
|---|---|---|
| JP | 2011-044224 A | 3/2011 |
| JP | 2012-209769 A | 10/2012 |
| JP | 2016-192761 A | 11/2016 |
| JP | 2017-069456 A | 4/2017 |
| JP | 2019-191920 A | 10/2019 |
| JP | 2021-087044 A | 6/2021 |

OTHER PUBLICATIONS

Cheng, Chaoran et al., Mar. 13, 2018, Information Processing Society of Japan (1), 1-85 to 1-86, "Collision detection by bus using Thruchip Interface", Lecture proceedigns (1) of the 80th National Convention of IPSJ (6 pages).

Kadomoto, Junichiro et al., Nov. 18, 2019, 37th IEEE International Conference on Computer Design (ICCD), pp. 100-108, "WiXI: An Inter-Chip Wireless Bus Interface for Shape-Changeable Chiplet-Based Computers" (9 pages).

Kadomoto, Junichiro et al., Sep. 4, 2019, International Conference on Solid State Devices and Materials 2019 (SSDM), pp. 1049-1050, "An inductively coupled wireless bus for inter-chiplet communication" (2 pages).

Kadomoto, Junichiro et al., Aug. 29, 2019, Information Processing Society of Japan pp. 107-115, "For Shape-Flexible Computer Systems RISC-V Host CPU Chip Design" Design Automation Symposium (14 pages).

Kadomoto, Junichiro et al., Mar. 10, 2019, The Institute of Electronics, Information and Communication Engineers, pp. 1-6, "Analysis and Design of Horizontal Inter-Chip Wireless Bus" Technical Report of IEICE (English Abstract) (6 pages).

Kadomoto, Junichiro et al., Mar. 17, 2019, The Institute of Electronics, Information and Communication Engineers, pp. 1-38 "Analysis and Design of Horizontal Chip-to-Chip Wireless Bus" (74 pages).

Kadomoto, Junichiro et al., Nov. 28, 2018, The Institute of Electronics, Information and Communication Engineers, pp. 1-6, "Horizontal Wireless Bus for Free-Form SiP" Technical Report of IEICE (English Abstract) (6 pages).

Kadomoto, Junichiro et al., Dec. 5, 2018, The Institute of Electronics, Information and Communication Engineers, pp. 1-22, "Horizontal Chip-to-Chip Wireless Bus" (44 pages).

International Search Report (English and Japanese) issued in PCT/JP2020/043363, mailed Feb. 2, 2021; ISA/JP (7 pages).

* cited by examiner

ABOUT 300 μm

FIG. 18

|  | CICC'15 | VLSI'11 | VLSI'13 | PROPOSED METHOD (Sim) |
|---|---|---|---|---|
| AREA EFFICIENCY [Gb/s/mm²] | 500 | 167 | 94 | 159 |
| POWER EFFICIENCY [pJ/b] | 0.30 | 2.6 | 0.10 | 0.55 |
| CONNECTION METHOD | TSV, INTERPOSER | TSV, INTERPOSER | TSV, INTERPOSER | WIRELESS BUS |
| MANUFACTURING PROCESS | 28nm | 45nm | 40nm | 45nm |

EYE PATTERN

BATHTUB CURVE

SYSTEM-ON-CHIP WITH A PLURALITY OF CHIPS COMMUNICATING WIRELESSLY USING HORIZONTAL INDUCTIVE COUPLING

CROSS REFERENCE TO RELATED APPLICATIONS

This application is a U.S. National Phase Application under 35 U.S.C. 371 of International Application No. PCT/JP2020/043363, filed on Nov. 20, 2020, which claims priority to Japanese Patent Application No. 2019-212966, filed on Nov. 26, 2019. The entire disclosures of the above applications are expressly incorporated by reference herein.

BACKGROUND

Technical Field

The present invention relates to an information processing apparatus.

Related Art

A Soc (System-on-a-Chip) in which different blocks are mixedly mounted on a single chip is known.

FIG. 2 in Patent Application Publication No. 2019-191920 discloses a processor Soc.

However, the conventional Soc has a problem that mounting shape and shape variation are limited.

The present invention has been made in view of the above circumstances and provided an information processing apparatus capable of flexibly responding to mounting shape and shape variation.

SUMMARY

According to one aspect of the present invention, provided is an information processing apparatus comprising a plurality of chips, wherein the plurality of chips are horizontally integrated, a pair of transmitting coil and receiving coil are formed on each of the plurality of chips, and each of the plurality of chips communicate each other via a wireless connection using horizontal inductive coupling.

Advantageous Effect of the Invention

According to one aspect of the present invention, it is possible to provide an information processing apparatus capable of flexibly responding to mounting shape and shape variation.

BRIEF DESCRIPTION OF THE DRAWINGS

FIG. 18 is a diagram showing a performance comparison between a conventional wired communication technology and a wireless bus technology.

DETAILED DESCRIPTION

Hereinafter, embodiments of the present invention will be described with reference to the drawings. Various features described in the embodiment below can be combined with each other.

In the present embodiment, the "unit" may include, for instance, a combination of hardware resources implemented by circuits in a broad sense and information processing of software that can be concretely realized by these hardware resources. Further, various information is performed in the present embodiment, and these information can be represented by high and low signal values as a bit set of binary numbers composed of 0 or 1, and communication/calculation can be performed on a circuit in a broad sense.

Further, the circuit in a broad sense is a circuit realized by combining at least an appropriate number of a circuit, a circuitry, a processor, a memory, and the like. In other words, it is a circuit includes Application Specific Integrated Circuit (ASIC), Programmable Logic Device (e.g., Simple Programmable Logic Device (SPLD), Complex Programmable Logic Device (CPLD), and Field Programmable Gate Array (FPGA)), and the like.

Embodiment 1

1. Horizontal Chip-to-Chip Wireless Bus

Figure 1:
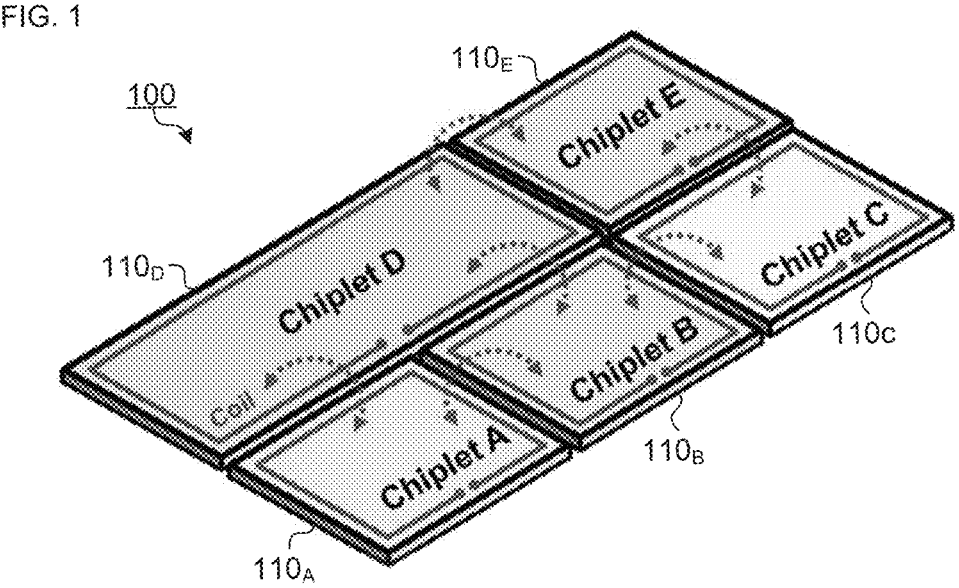
FIG. 1 is a diagram (part 1) showing an example of chip-to-chip wireless bus in horizontal direction.
Figure 2:
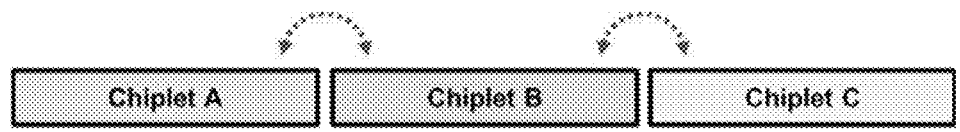
FIG. 2 is a diagram (part 2) showing an example of chip-to-chip wireless bus in horizontal direction.

FIG. 1 is a diagram (part 1) showing an example of chip-to-chip wireless bus in a horizontal direction. Further, FIG. 2 is a diagram (part 2) showing an example of chip-to-chip wireless bus in a horizontal direction. An information processing apparatus 100 comprises a plurality of chips $110_A$ to $110_E$. The plurality of chips $110_A$ to $110_E$ are horizontally integrated. A pair of transmitting coil and receiving coil are formed on each of the plurality of chips. Each of the plurality of chips $110_A$ to $110_E$ communicate each other via a wireless connection using horizontal inductive coupling.

As shown in FIG. 1, an on-chip coil is formed using an internal wiring of the chip. In addition, as shown in FIGS. 1 and 2, the chips communicate each other via a wireless connection using horizontal inductive coupling.

With such a configuration, there is no need to set up and manufacture a silicon interposer, and the information processing apparatus 100 can be constructed at low cost by flexibly combining chiplets.

Figure 3:
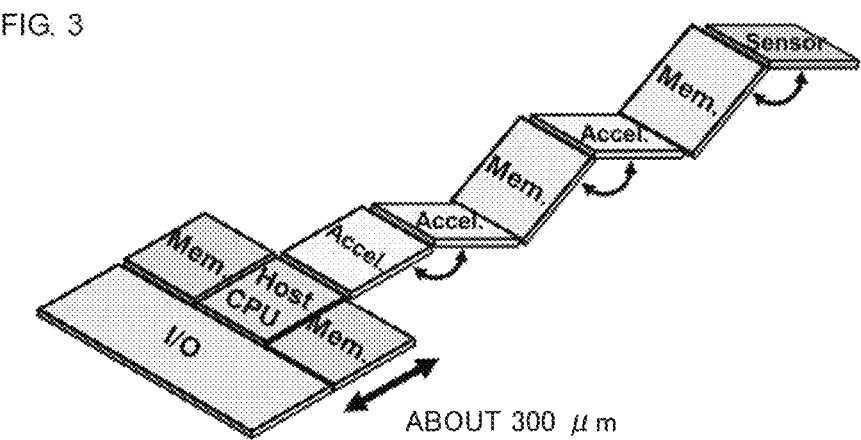
FIG. 3 is a diagram (part 3) showing an example of chip-to-chip wireless bus in horizontal direction.

FIG. 3 is a diagram (part 3) showing an example of chip-to-chip wireless bus in a horizontal direction. As shown in FIG. 3, the information processing apparatus 100 can be implemented in any shape. For instance, it is possible to implement a series of long slender chips like a fiber itself, a mounting in which a relative angle between the chips is slanted, and a system in which the shape is deformed during operation. One of the plurality of chips configuring the information processing apparatus 100 is a CPU (Central Processing Unit). Further, one of the plurality of chips configuring the information processing apparatus 100 is a memory. The information processing apparatus 100 is not limited thereto. Hardware configuring the information processing apparatus 100 may be configured of one or more chips. For instance, a CPU may be configured by at least two or more of the plurality of chips configuring the information processing apparatus 100. That is, the chips configuring the information processing apparatus 100 can be flexibly separated.

The information processing apparatus 100 does not necessarily have to comprise a CPU and a memory.

Figure 4:
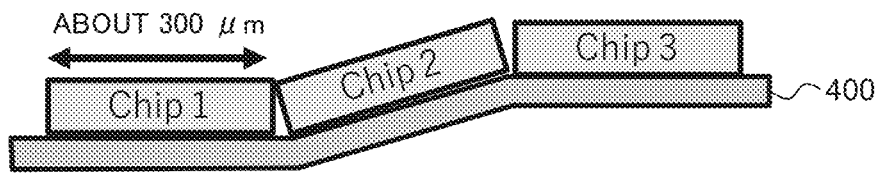
FIG. 4 is a diagram showing an example when combined with a wireless electric power supply technology.

FIG. 4 is a diagram showing an example when combined with a wireless electric power supply technology.

In the information processing apparatus 100, the chips can be implemented on a diverse substrate 400 by combining horizontal chip-to-chip wireless bus and wireless power supply technology. Further, the chips can be easily replaced even after implementation. As shown in FIG. 4, a plurality of chips are horizontally integrated on the substrate 400. Here, the substrate 400 is a variable shape member. The variable shape member is a member that can be deformed in shape, for example, flexible substrate, plastic, fiber, or the like. The information processing apparatus 100 can be constructed simply by fixing and arranging chips on such a variable shape member with something such as DAF tape, and in the event of a failure or system updater, a new information processing apparatus 100 can be realized in which the chips need only be replaced and rearranged.

2. Horizontal Inductive Coupling Between Coils

First, horizontal inductive coupling between on-chip coils will be illustrated. Degree of coupling between coils is mainly determined by length and distance of one adjacent side of two coils. Therefore, as the coil is larger and the distance between adjacent sides is shorter, the coupling becomes stronger. Through such an inductive coupling, a signal can be transmitted from the transmitting coil to the receiving coil.

Figure 5:
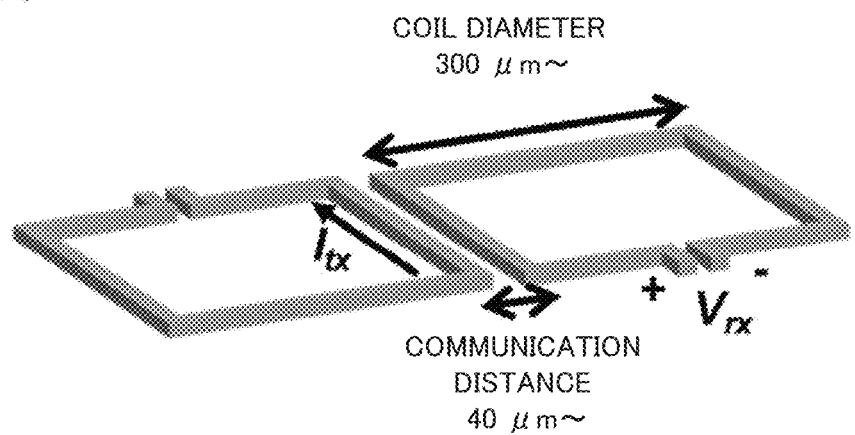
FIG. 5 is a diagram (part 1) for illustrating horizontal inductive coupling between coils.
Figure 6:
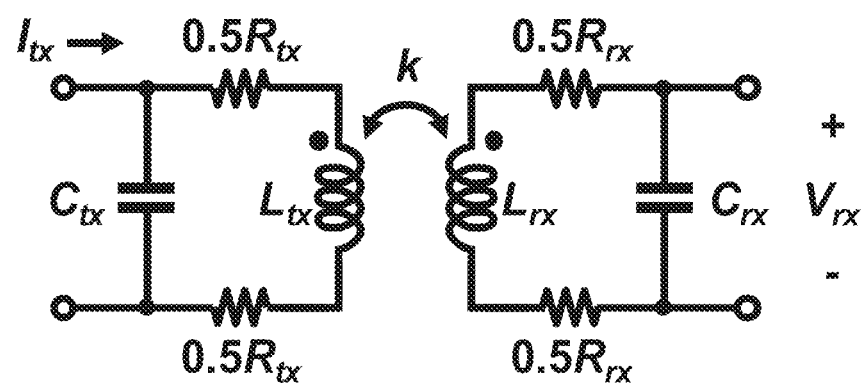
FIG. 6 is a diagram (part 2) for illustrating horizontal inductive coupling between coils.

For instance, as shown in FIG. 5, when a transmitting current Itx flows toward a back side of a screen, a corresponding receiving voltage Vrx is induced on a receiving side. Characteristics of this coil can be represented by an equivalent circuit shown in FIG. 6. The receiving voltage is obtained by multiplying a first-order differential waveform of the transmitting current Itx with a second-order low-pass filter characteristics on the transmitting side and the receiving side. Further, amplitude of the receiving voltage Vrx is proportional to the transmitting current and a coupling coefficient. Assuming that a threshold value for normally restoring data on the receiving side is constant, it is necessary to flow a double current when the coupling coefficient is halved, which determines power consumption of a transmitting circuit.

3. Transmitting/Receiving Core Circuit

Figure 7:
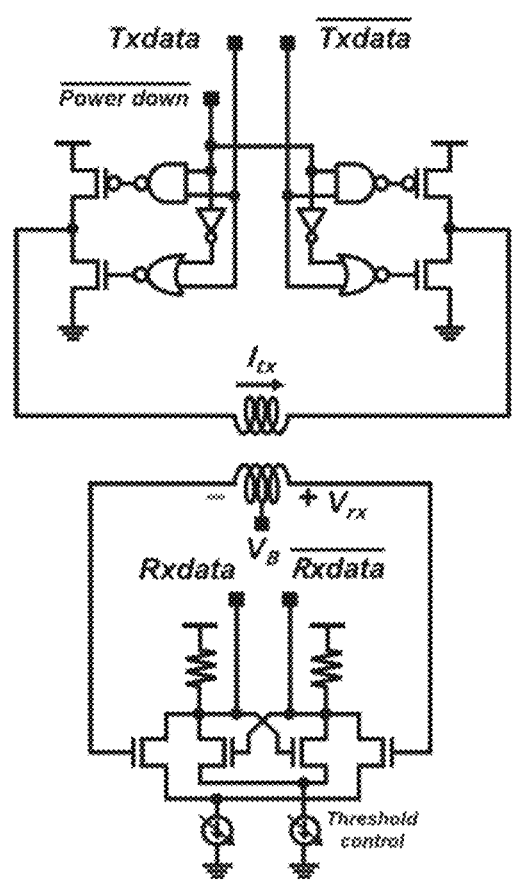
FIG. 7 is a diagram showing an example of a transmitting/receiving core circuit.
Figure 8:
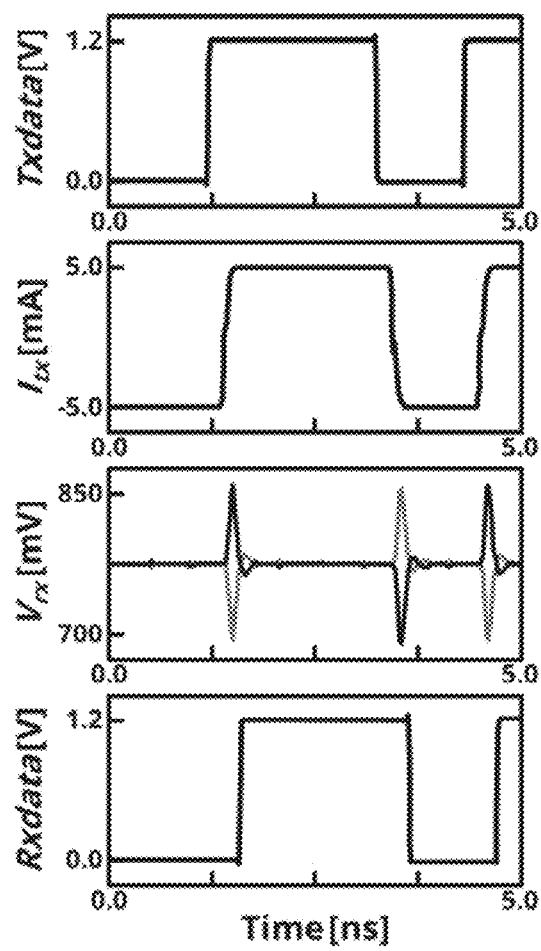
FIG. 8 is a diagram showing an example of an operation waveform in a transmitting/receiving core circuit.

Subsequently, a transmitting/receiving core circuit will be described with reference to FIGS. 7 and 8. FIGS. 7 and 8 are diagrams for illustrating the transmitting/receiving core circuit configured on the chip. Here, the coil is driven by two inverters. The transmitting current Itx in a direction corresponding to input Txdata flows into the coil, resulting in a pulse voltage corresponding to data transition is generated on a receiving side as shown in FIG. 8. At this time, polarity of pulse differs depending on whether the data transition is from LOW to HIGH or from HIGH to LOW. A hysteresis comparator on the receiving side restores the pulse voltage to original NRZ data, and final Rxdata is obtained as shown in FIG. 8.

4. Transmitting/Receiving Circuit

Figure 9:
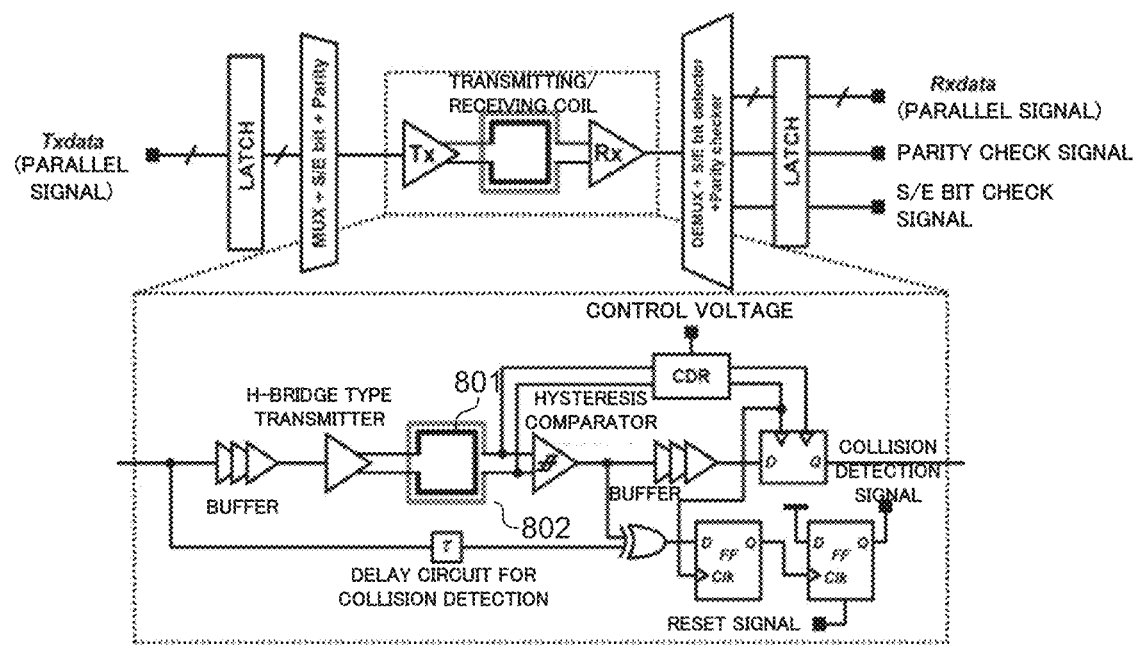
FIG. 9 is a diagram showing an example of a transmitting/receiving circuit configured on a chip.

FIG. 9 is a diagram showing an example of a transmitting/receiving circuit configured on a chip. A method of serializing and burst transferring a parallel signal sent from a core is adopted. As shown in FIG. 9, a SerDes (SERializer/DESerializer) for connection to a digital circuit and a CDR circuit are mounted in the transmitting/receiving circuit. Further, the transmitting/receiving circuit is also mounted with a collision detection circuit. When a collision of transmitting data occurs between chips, the collision detection circuit retransmits data according to a procedure defined by an upper protocol. A transmitting coil 801 is a transmitter coil. A receiving coil 802 is a receiving coil.

Figure 10:
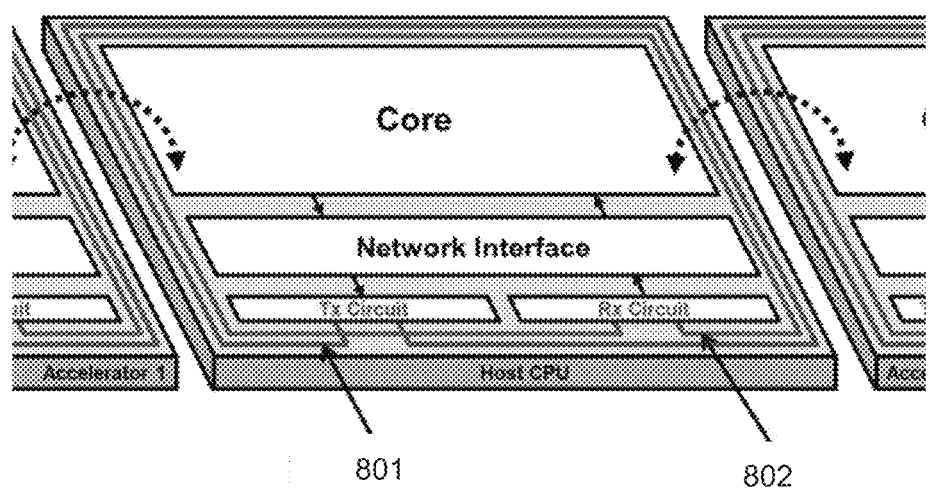
FIG. 10 is a diagram showing an example of a transmitting coil and a receiving coil.

FIG. 10 is a diagram showing an example of the transmitting coil 801 and the receiving coil 802. In the present embodiment, since a large coil of several mm square is utilized, area of entire interface becomes extremely large. However, since influence of a magnetic field generated by an on-chip coil on an internal circuit is small, as shown in FIG. 10, a coil is formed along a peripheral portion where wiring resources are more abundant than inside of the core, and a core circuit, a network interface, or a transmitting/receiving circuit can be formed inside thereof. Considering communication characteristics and design example of a typical square chip, each side of the transmitting coil 801 and the receiving coil 802 has a length of at least about 90% with respect to each side of the chip. An opening area of the transmitting coil and an opening area of the receiving coil should be 80% or more of an area of the chip.

The transmitting coil 801 and the receiving coil 802 may be formed on different layers of the chip. Further, the transmitting coil 801 and the receiving coil 802 may be formed at substantially same position on each of the plurality of chips.

5. Electromagnetic Field Simulation Environment

Figure 11:
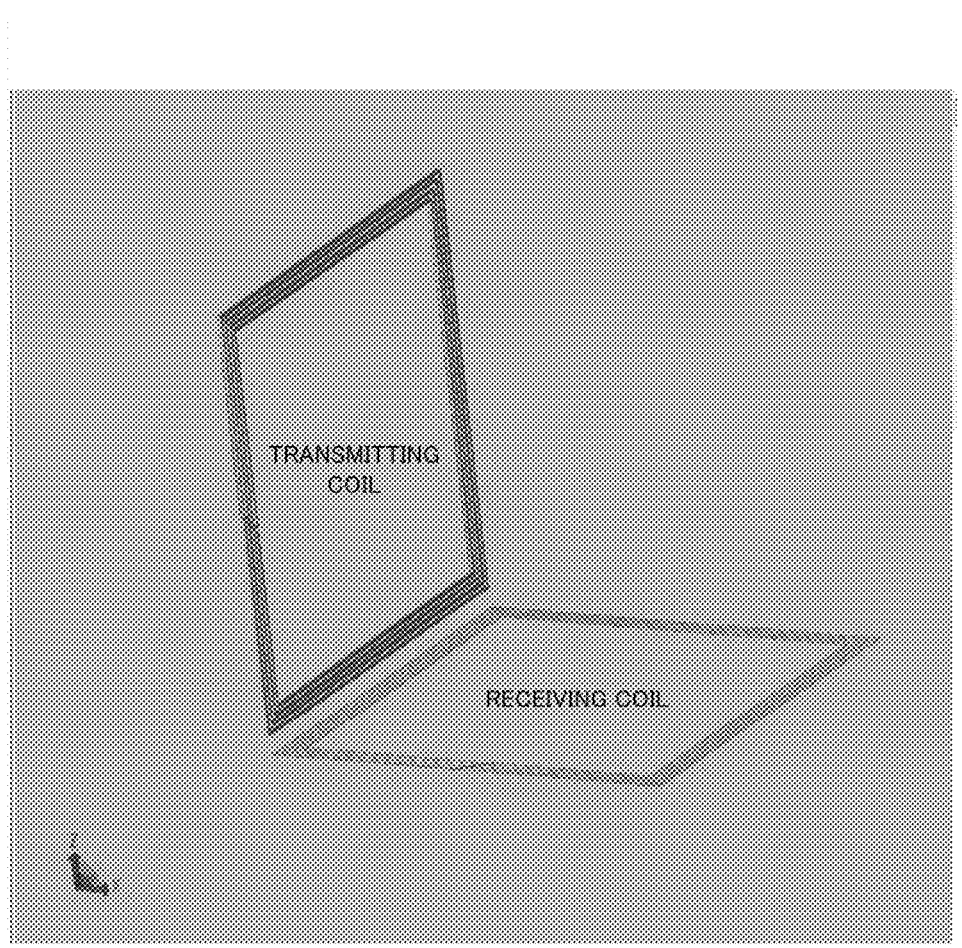
FIG. 11 is a diagram showing an example of an electromagnetic field simulation environment.

FIG. 11 is a diagram showing an example of an electromagnetic field simulation environment. A simulation model of a coil and a substrate are created based on parameters of a manufacturing process, and a coupling coefficient between coils is investigated by using EmPro, which is a three-dimensional electromagnetic field simulator of Keysight Technologies. S parameter obtained by the electromagnetic field simulation is fitted to an equivalent circuit, and a coupling coefficient and mutual inductance obtained from the result are adopted as a simulation result.

6. Mutual Inductance of Rectangular Coils

Figure 12:
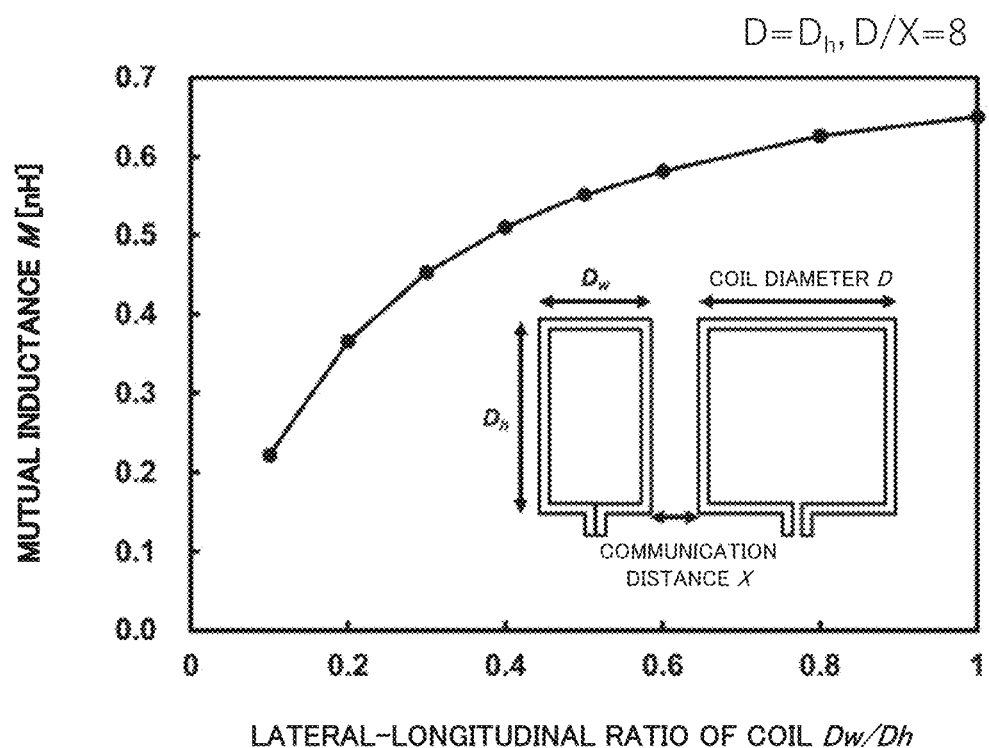
FIG. 12 is a diagram showing an example of mutual inductance of vertically long rectangular coils.
Figure 13:
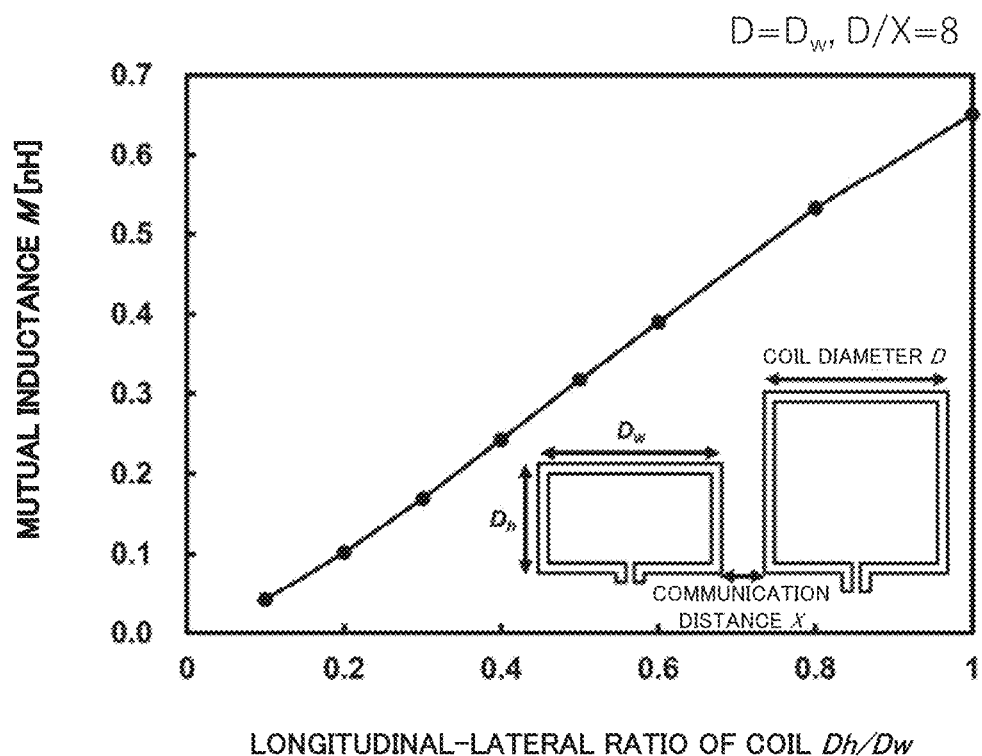
FIG. 13 is a diagram showing an example of mutual inductance of horizontally long rectangular coils.

FIGS. 12 and 13 are diagrams showing examples of mutual inductance of rectangular coils. FIG. 12 shows a change in a mutual inductance when a side Dw, which is orthogonal to a side closest to an adjacent coil of the transmitting coil, is shortened. As can be seen from a result, even when Dw is halved, the mutual inductance is 85% as compared with a case of a square, and the mutual inductance decreases relatively slowly.

On the other hand, FIG. 13 shows a change in a mutual inductance when a side closest to an adjacent coil is shortened. The mutual inductance decreases linearly as the side becomes shorter, and when the side is halved, the mutual inductance is 49% as compared with the case of the square.

From the results, it was clarified that the coils are coupled even in the rectangular case and that the mutual inductance changes according to the shape. Since the side closest to the adjacent coil contributes strongly to coupling, the mutual inductance decreases linearly when the side becomes shorter. For example, when the mutual inductance is kept at a value of 90% or more based on the case of a square coil, the side (Dw) orthogonal to the side closest to the adjacent coil needs to be 60% or longer, and the side (Dh) closest to the adjacent coil needs to be 90% or longer.

7. Relationship Between Relative Angle and Coupling Coefficient

Figure 14:
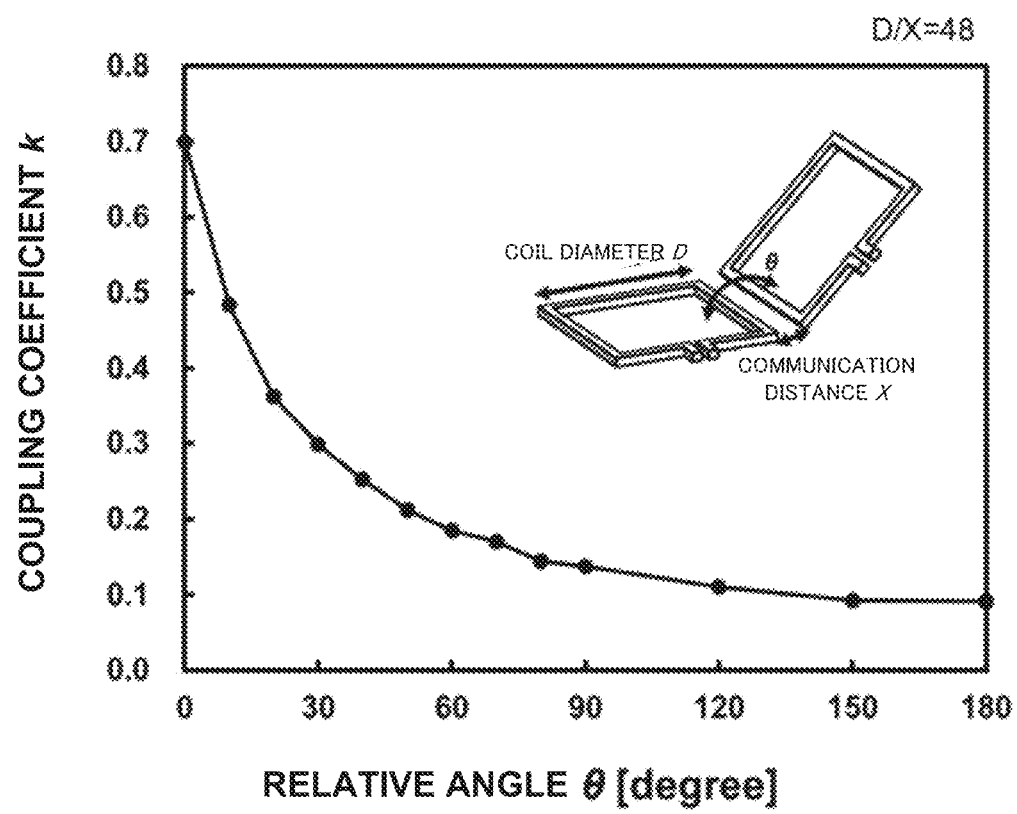
FIG. 14 is a diagram showing a simulation result when a relative angle between coils changes.

FIG. 14 is a diagram showing a simulation result when a relative angle between coils changes. As shown in FIG. 14, it was confirmed by a simulation that the coupling coefficient monotonically increases as the relative angle decreases when the coils are oblique to each other.

From the result, it was found that although the oblique coils also couple with each other, the coupling coefficient changes according to the relative angle. Here, considering a hysteresis comparator of the receiving circuit, an input voltage thereof is required to be in a range that is equal to or higher than a threshold value of a comparator and does not exceed a supply voltage. For example, if an amplitude for a relative angle of 180 degrees, which is the lowest signal amplitude, is 100 mV, then a received signal amplitude at a relative angle of 0 degree would be 760 mV. Assuming a process with a core supply voltage of about 1 V, it is considered as a typical design example that a maximum voltage amplitude does not exceed the supply voltage, and at a minimum, a sufficient amplitude that is not buried in the noise floor can be secured.

8. Circuit Simulation

Figure 15:
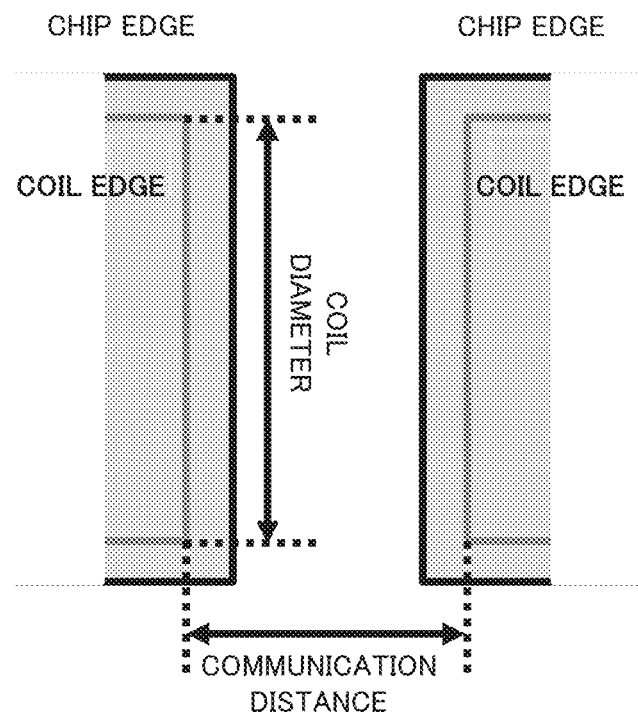
FIG. 15 is a diagram for illustrating a coil diameter and a communication distance.

By circuit simulation, performance of the transmitting/receiving circuit and influence of ring-shaped wiring on communication characteristics are investigated. A 45 nm CMOS process was assumed as a manufacturing process, and a coil diameter is investigated in a range of 100 μm to 5 mm in a square. At this time, a communication distance is set to a value of 1/10 of the coil diameter. FIG. 15 is a diagram for illustrating a coil diameter and a communication distance.

For parts of coil and ring-shaped wiring, a model is created from the result of the electromagnetic field simulation, which is then included in the circuit simulation.

9. Simulation Waveform of Transmitting/Receiving Core Circuit

Figure 16:
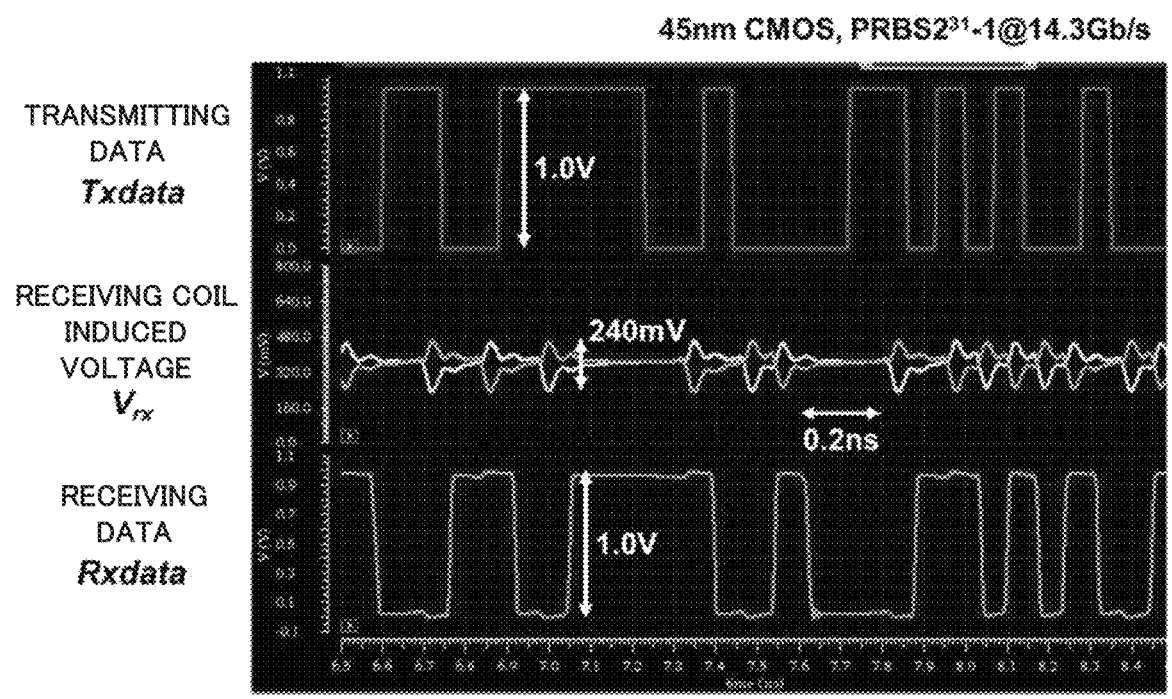
FIG. 16 is a diagram showing an example of a simulation waveform of a transmitting/receiving core circuit.

FIG. 16 is a diagram showing an example of a simulation waveform of a transmitting/receiving core circuit. Under a condition of a coil diameter of 300 μm, transfer of PRBS31 signal is simulated, and a maximum transfer rate of 14.3 Gb/s and power consumption of 7.91 mW are achieved.

10. Relationship Between Coil Diameter and Maximum Transfer Rate

Figure 17:
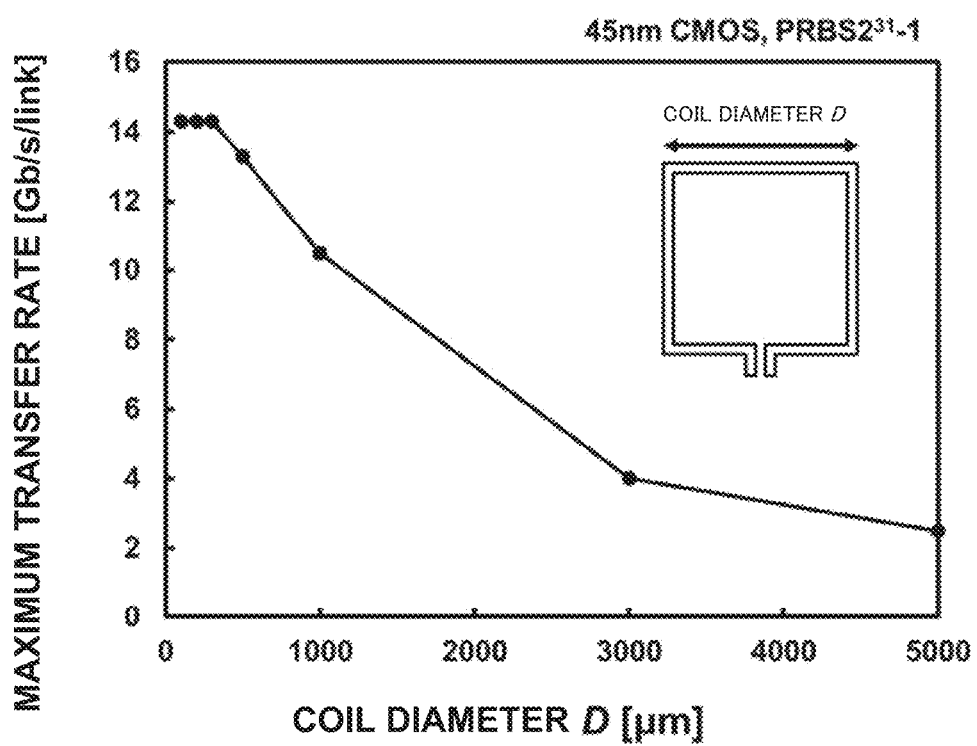
FIG. 17 is a diagram showing a relationship between a coil diameter and a maximum transfer rate.

FIG. 17 is a diagram showing a relationship between a coil diameter and a maximum transfer rate. As the coil diameter decreases, a parasitic capacitance decreases, thus the maximum transfer rate improves. In a process of the present embodiment, since a transmission rate is limited by the transmitting/receiving circuit, a transfer rate is not improved for a coil of 300 μm or less, but further performance improvement can be expected when an advanced process is used. In other words, performance of wireless bus technology can be expected to improve by development of process miniaturization, finer granularity of each chiplet, and mounting technology.

11. Performance Comparison

FIG. 18 is a diagram showing a performance comparison between a conventional wired communication technology and a wireless bus technology. Three on left are all high-speed communication technologies using silicon interposer. With the wireless bus technology, a result comparable to the wired communication technology using the silicon interposer in terms of data transfer efficiency per interface area and power efficiency can be obtained.

12. Influence of Ring-Shaped Wiring

Figure 19:
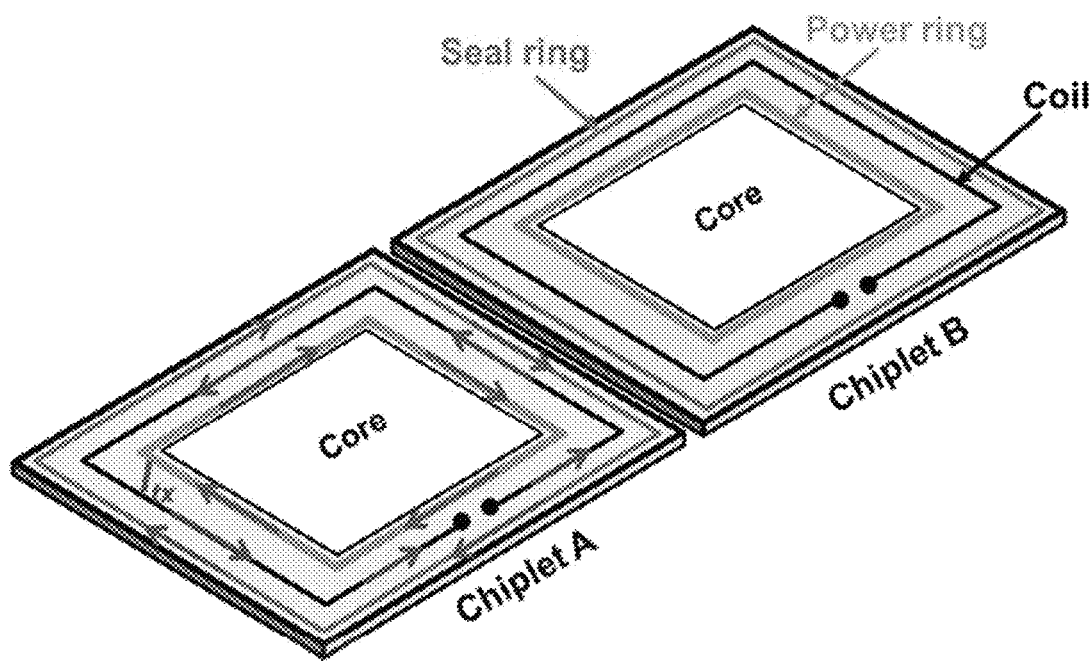
FIG. 19 is a diagram showing influence of ring-shaped wiring.

FIG. 19 is a diagram showing influence of ring-shaped wiring. As shown in FIG. 19, when a ring-shaped wiring of the same size as the coil exists on the chip, eddy current in an opposite direction flow through these ring-shaped wirings when the transmitting current flows, which may adversely affect communication characteristics. Examples of such ring-shaped wiring include a power ring for power distribution and a seal ring for chip protection.

13. Influence of Power Ring

Figure 20:
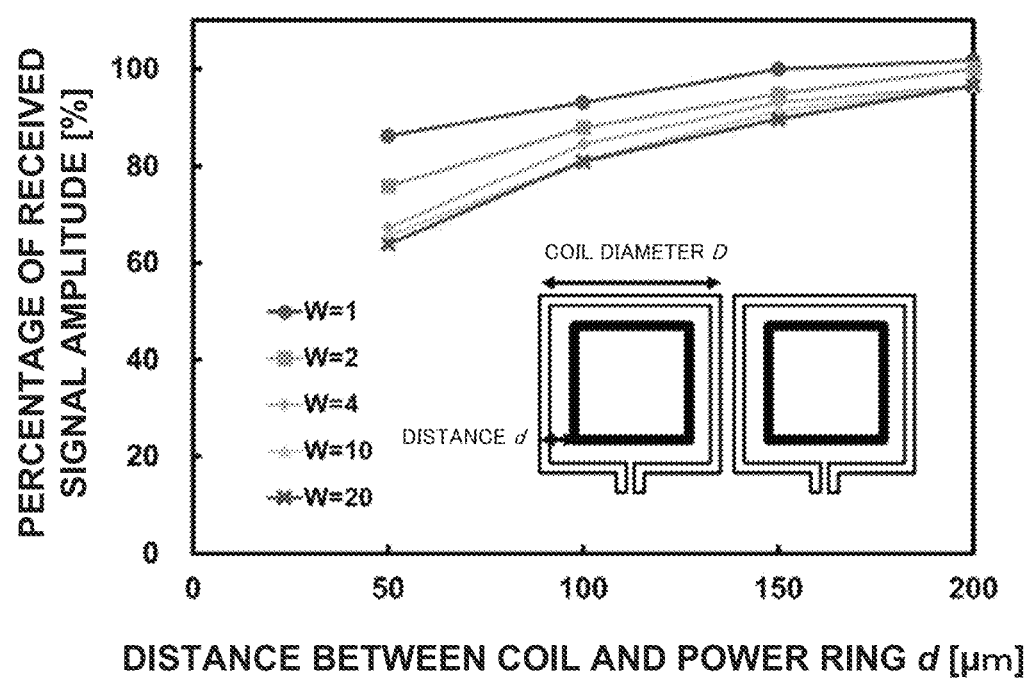
FIG. 20 is a diagram showing influence of a power ring.

FIG. 20 is a diagram showing influence of a power ring. When a power ring is present on the chip, a received signal amplitude decreases due to influence of eddy current. Such influence can be mitigated to some extent by making the power ring thinner and by increasing distance between the coil and the power ring. For example, in order to obtain an amplitude of about 80% when the thickness of the power ring is 20 µm and the ring does not exist, a distance d from the ring needs to be 150 µm or more when the coil diameter is 1 mm.

14. Effect of Seal Ring

Figure 21:
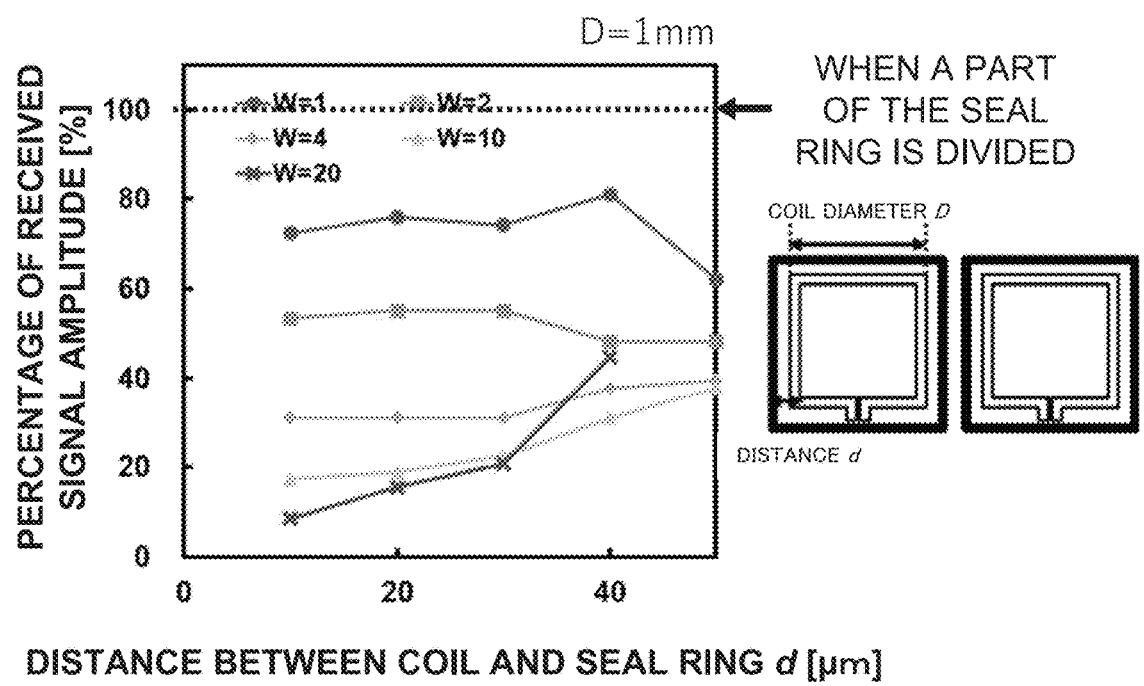
FIG. 21 is a diagram showing influence of a seal ring.

FIG. 21 is a diagram showing influence of a seal ring. Even if there is a seal ring on the chip, the received signal amplitude decreases due to influence of eddy current. Such influence can be mitigated to some extent by making the seal ring thinner. For example, in order to obtain an amplitude of about 50% when the ring does not exist, thickness of the seal ring needs to be 2 µm or less. On the other hand, even when a part of the seal ring is cut off, if length of the cut-off part is short enough, it can function as a seal ring and can prevent moisture penetration and crack propagation without problems. Simulation using a partially cut seal ring shows no influence on the received signal amplitude. Therefore, if possible in the process, using a divided seal ring may be considered as an option.

15. Prototype Substrate

Figure 22:
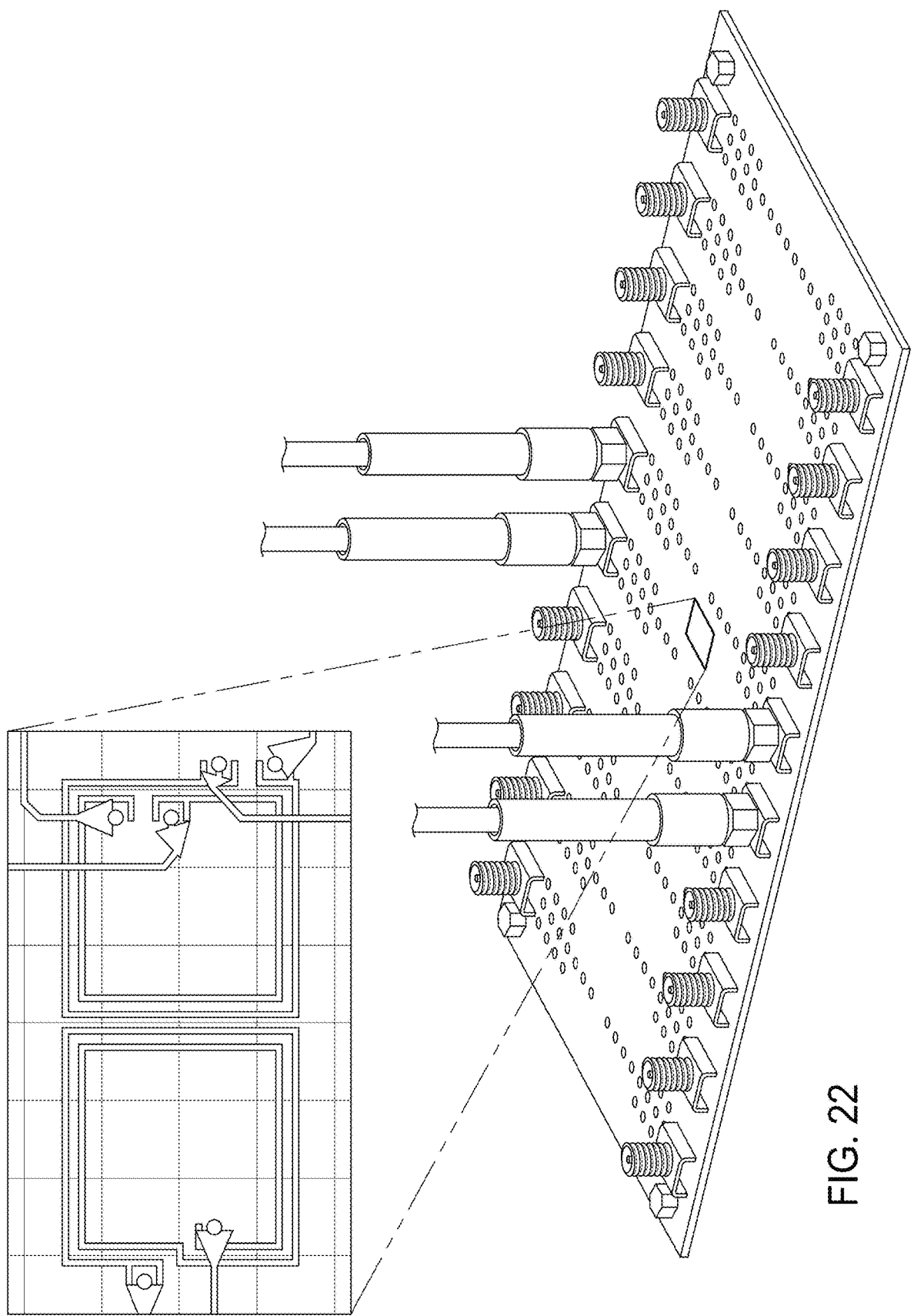
FIG. 22 is a diagram showing an example of a prototype substrate.

FIG. 22 is a diagram showing an example of a prototype substrate. In order to evaluate the wireless bus technology through an actual measurement, a prototype substrate is designed, prototyped, and measured. A high-speed hysteresis comparator IC is used as receiving circuit, and a pulse waveform transmitted via the coil is restored to an NRZ waveform.

16. Measurement Result

Figure 23:
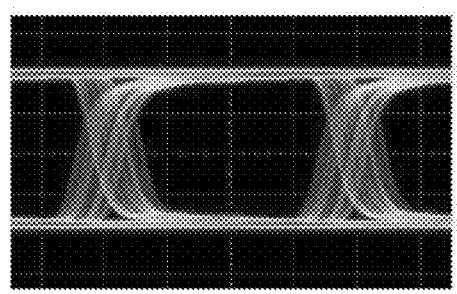
FIG. 23 is a diagram showing an example of a measured eye pattern and bathtub curve.
Figure 23:
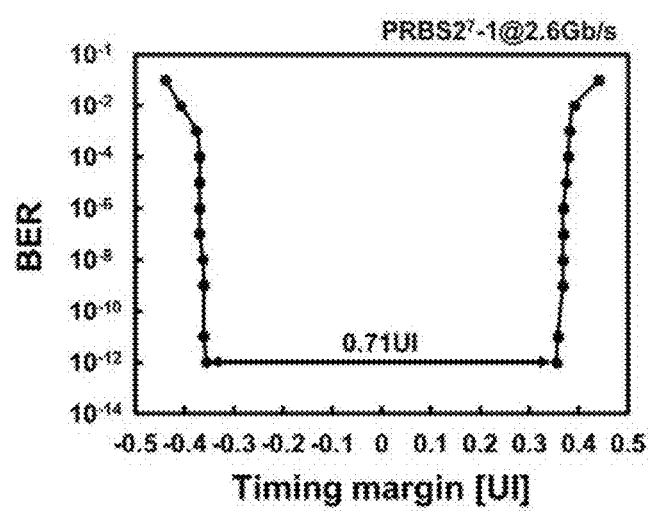

FIG. 23 is a diagram showing an example of a measured eye pattern and bathtub curve. When PRBS7 signal is applied, a maximum transfer rate of 2.6 Gbps is achieved under a condition that BER is 10-12 or less. At that time, a sufficiently wide result is obtained with a timing margin of 0.71 UI.

17. Effect of Embodiment 1

According to embodiment 1, an information processing apparatus capable of flexibly responding to mounting shape and shape variation can be provided.

Modification 1

1. Electromagnetic Field Simulation Environment

Figure 24:
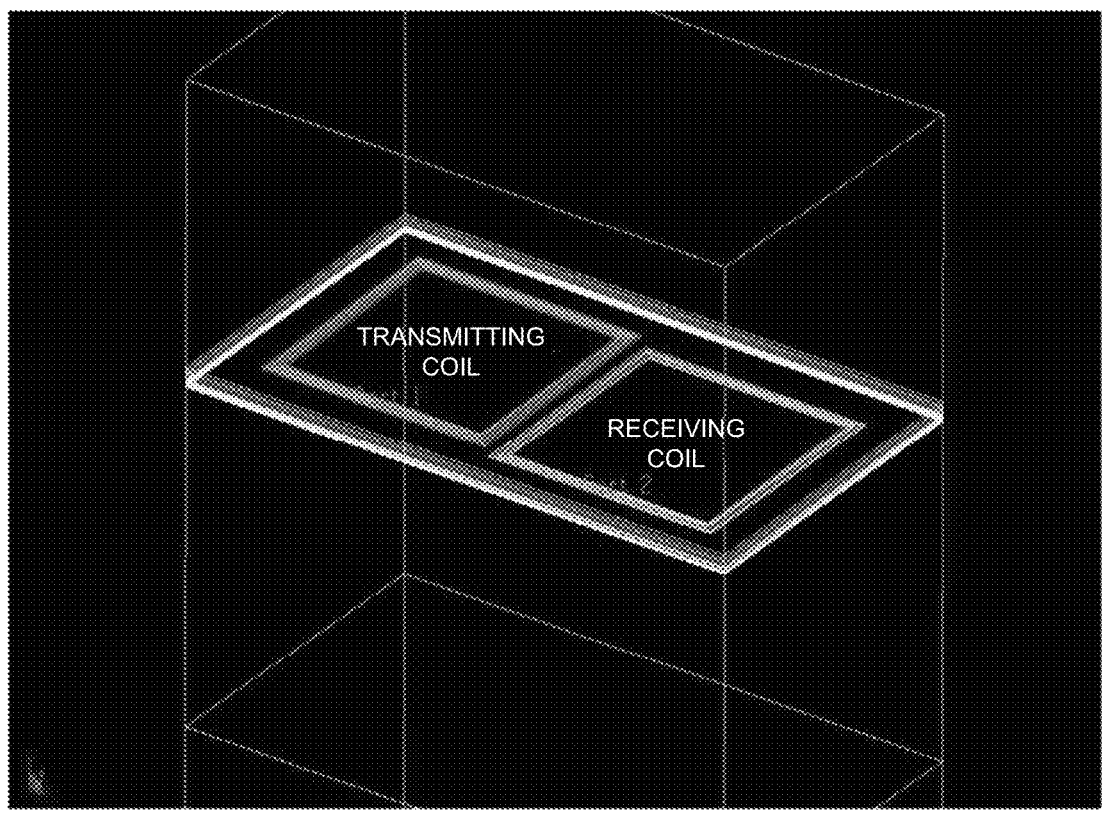
FIG. 24 is a diagram showing an example of an electromagnetic field simulation environment.

FIG. 24 is a diagram showing an example of an electromagnetic field simulation environment. A simulation model of a coil and a substrate is created based on parameter of a manufacturing process, and a coupling coefficient between coils is investigated by using Momentum, which is a three-dimensional electromagnetic field simulator of Keysight Technologies.

2. Relationship Between Communication Distance and Coupling Coefficient

Figure 25:
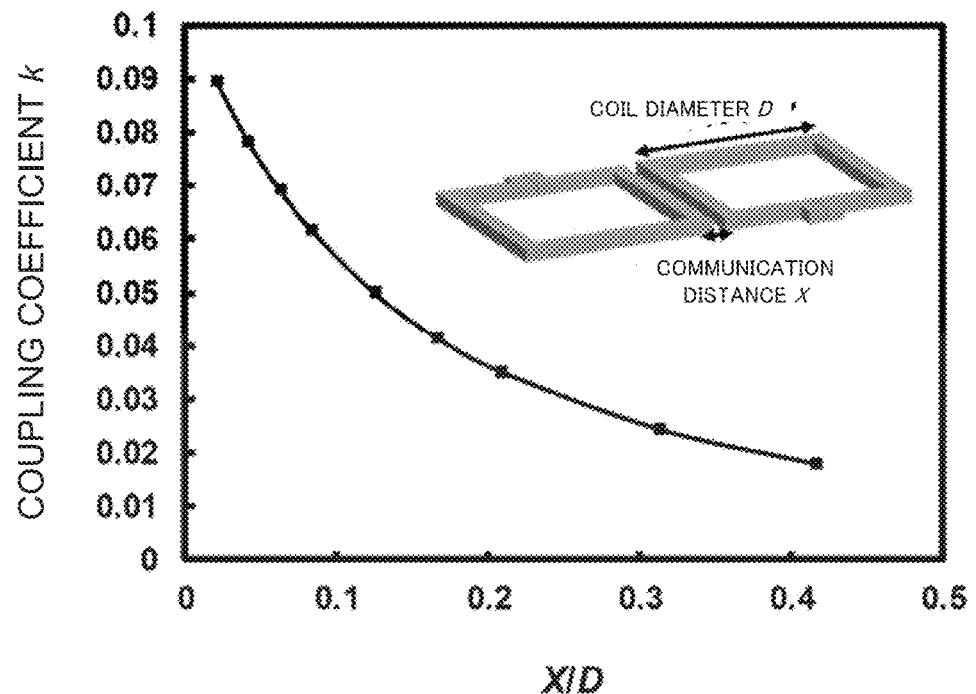
FIG. 25 is a diagram showing a relationship between a communication distance and a coupling coefficient.

FIG. 25 is a diagram showing a relationship between a communication distance and a coupling coefficient. As shown in FIG. 25, a coupling coefficient k monotonically decreases as a communication distance X increases. In horizontal inductive coupling, the coupling coefficient is 0.023 when a coil diameter D is three times the communication distance X, which is a value of ¼ or less. Here, considering a case where the coil diameter is 5 mm and the communication distance is 800 µm, then the coupling coefficient is 0.042. That is, a transmitting current of about 3.6 times that of conventional inductively coupled communication is required.

3. Relationship Between Coil Misalignment and Coupling Coefficient

Figure 26:
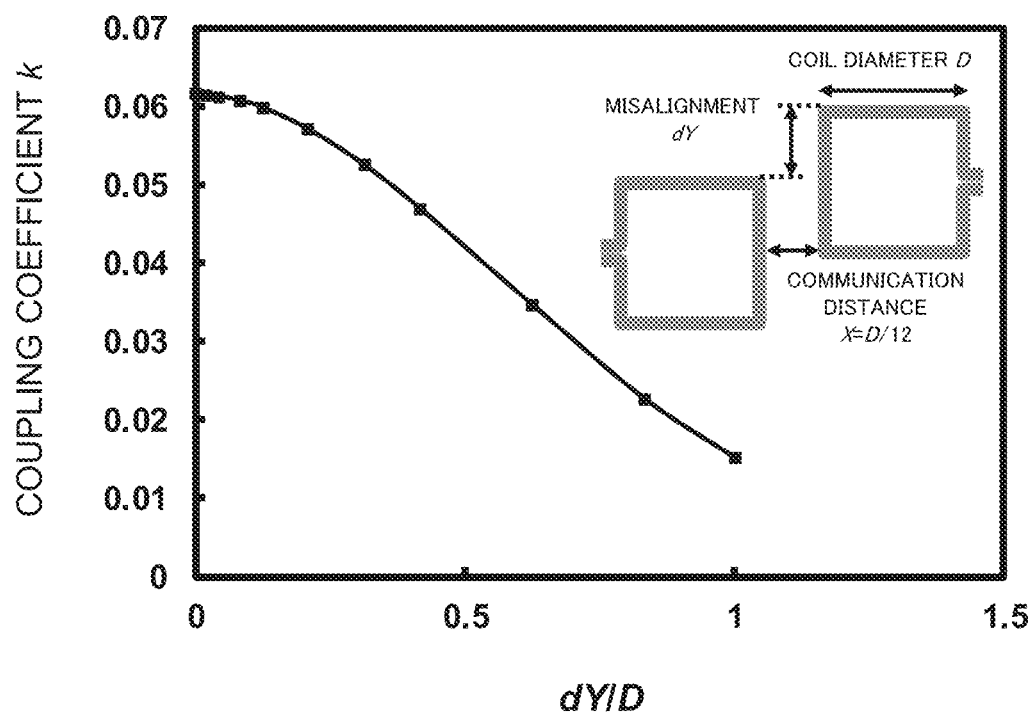
FIG. 26 is a diagram showing a relationship between a coil misalignment and a coupling coefficient.

FIG. 26 is a diagram showing a relationship between a coil misalignment and a coupling coefficient. Under a condition that the coil diameter D is 12 times the communication distance X, change of the coupling coefficient k according to a misalignment dY is presented. Even when a position is displaced by about 10% of the coil diameter, the coupling coefficient changes by only 3%. For example, when the coil diameter is 5 mm, the transmitting current may be increased by only 3% even if the position of coil is displaced by 500 µm.

4. Coupling Coefficient when a Plurality of Coils are Arranged

Figure 27:
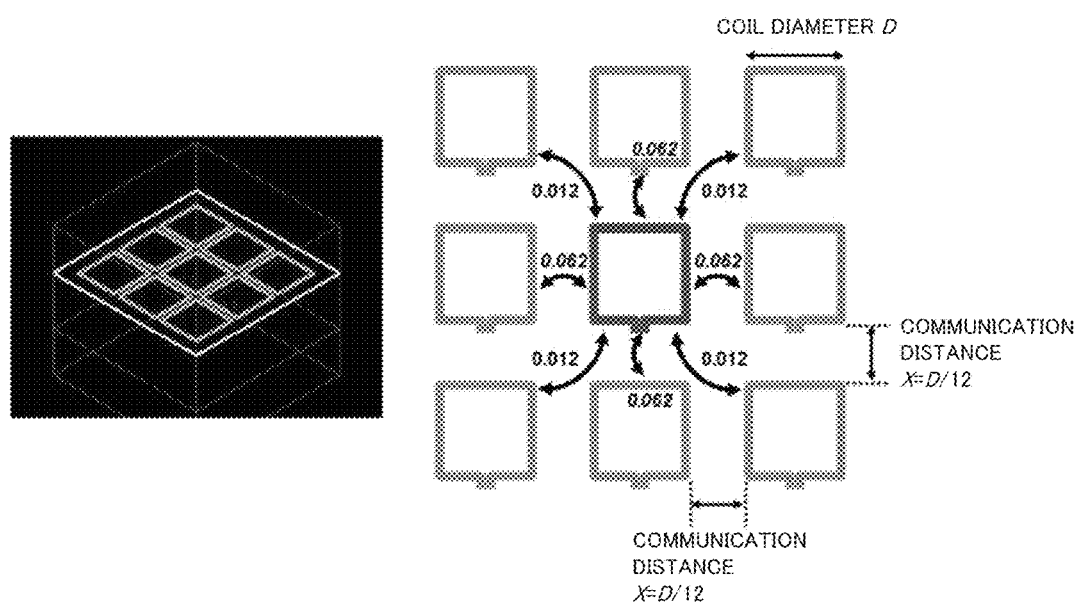
FIG. 27 is a diagram showing a coupling coefficient when a plurality of coils are arranged.

FIG. 27 is a diagram showing a coupling coefficient when a plurality of coils are arranged. As shown in FIG. 27, the coupling coefficient between coils adjacent in diagonal direction is about 20% of the coupling coefficient between coils adjacent in vertical and horizontal directions.

5. Circuit Simulation

Figure 28:
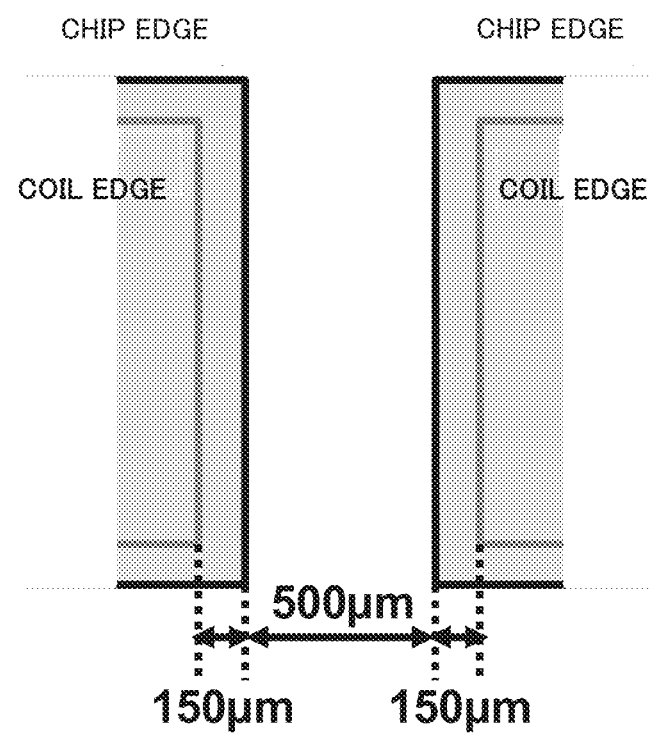
FIG. 28 is a diagram for illustrating a communication distance.

A simulation of the transmitting/receiving core circuit is created, and power consumption or the like is investigated. A 45 nm CMOS process is assumed as a manufacturing process, and the coil diameter is investigated at 5 mm. The communication distance is 0.8 mm. FIG. 28 is a diagram for illustrating the communication distance.

6. Simulation Waveform of Transmitting/Receiving Core Circuit

Figure 29:
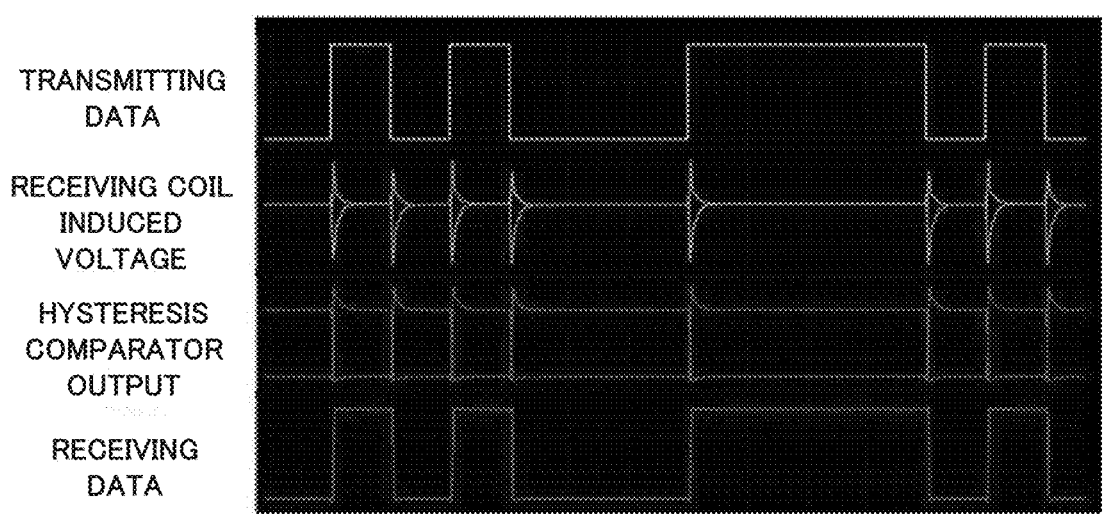
FIG. 29 is a diagram showing an example of a simulation waveform of a transmitting/receiving core circuit.

FIG. 29 is a diagram showing an example of a simulation waveform of transmitting/receiving core circuit. A voltage is generated in the receiving coil according to transition of input transmitting data, and original data is restored by the receiving circuit.

7. Performance of Transmitting/Receiving Core Circuit

Figure 30:
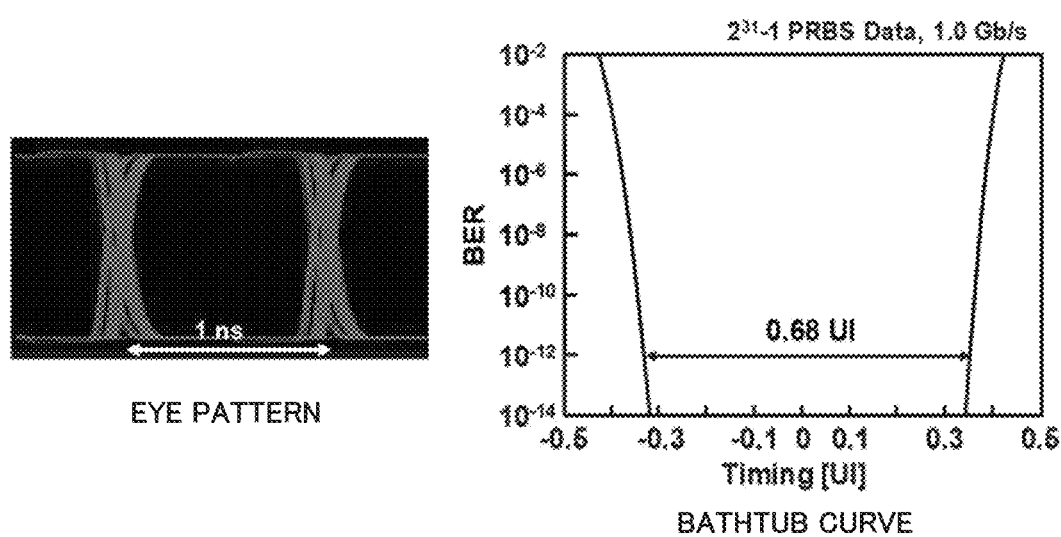
FIG. 30 is a diagram showing an example of a measured eye pattern and bathtub curve.

FIG. 30 is a diagram showing an eye pattern and a bathtub curve when a 1.0 Gb/s PRBS-31 signal is input. A timing margin of the designed transmitting/receiving core circuit at BER=$10^{-12}$ is 0.68 UI, and it is confirmed that the circuit operates with a sufficient margin. Further, power consumption of the transmitting/receiving core circuit is 11.1 mW when the communication distance is 0.8 mm and 6.41 mW when the communication distance is 0.5 mm.

The present invention may be provided in each of the following aspects.

In the information processing apparatus, the plurality of chips are horizontally integrated on a substrate, and the substrate is a variable shape member.

In the information processing apparatus, the variable shape member is a flexible substrate.

In the information processing apparatus, the variable shape member is made of a plastic.

In the information processing apparatus, the variable shape member is made of a fiber.

In the information processing apparatus, the transmitting coil and the receiving coil are formed at substantially same position on each of the plurality of chips.

In the information processing apparatus, the transmitting coil and the receiving coil are formed on different layers of the chip.

In the information processing apparatus, an opening area of the transmitting coil and an opening area of the receiving coil are 80% or more of an area of the chip.

In the information processing apparatus, a seal ring is formed on each of the plurality of chips, and a part of the seal ring is divided.

In the information processing apparatus, a thickness of the seal ring is 2 µm or less.

In the information processing apparatus, a power ring is formed on each of the plurality of chips, and when a coil diameter of the transmitting coil and the receiving coil is approximately 1 mm, a distance between the transmitting coil and the receiving coil and the power ring is 150 µm or more.

In the information processing apparatus, one of the plurality of chips is a CPU (Central Processing Unit).

In the information processing apparatus, one of the plurality of chips is a memory.

In the information processing apparatus, a hardware configuring the information processing apparatus is configured of one or more chips among the plurality of chips.

In the information processing apparatus, the hardware is a CPU (Central Processing Unit).

Of course, the above aspects are not intended to limit the present invention.

Further, the above-mentioned embodiments and modifications may be implemented in any combination.

Finally, various embodiments of the present invention have been described, but these are presented as examples and are not intended to limit the scope of the invention. The novel embodiment can be implemented in various other forms, and various omissions, replacements, and changes can be made without departing from the abstract of the invention. The embodiment and its modifications are included in the scope and abstract of the invention and are included in the scope of the invention described in the claims and the equivalent scope thereof.

What is claimed is:

1. An information processing apparatus, comprising:
   a plurality of chips including a first chip and a second chip;
   a pair of transmitting coil and receiving coil formed on each of the plurality of chips, each coil of the pair of transmitting coil and receiving coil being formed along a periphery of each of the plurality of chips to define an inner area of each of the plurality of chips in a plan view; and
   a transmitting/receiving circuit formed on each of the plurality of chips, the transmitting/receiving circuit being configured with a transmitting circuit including an inverter and a receiving circuit including a hysteresis comparator, the transmitting/receiving circuit being formed at the inner area,
   wherein the plurality of chips communicate with one another via a wireless connection based on inductive coupling in a horizontal direction between the transmitting coil of the first chip and the receiving coil of the second chip, and
   at least one of a core circuit and a network interface is formed at the inner area of one of the plurality of chips, and the inner area is located inside of each coil of the pair of transmitting coil and receiving coil of the one of the plurality of chips in the plan view.

2. The information processing apparatus according to claim 1, wherein:
   the plurality of chips are horizontally integrated on a substrate, and
   the substrate is a variable shape member.

3. The information processing apparatus according to claim 2, wherein:
   the variable shape member is a flexible substrate.

4. The information processing apparatus according to claim 2, wherein:
   the variable shape member is made of a plastic.

5. The information processing apparatus according to claim 2, wherein:
   the variable shape member is made of a fiber.

6. The information processing apparatus according to claim 1, wherein:
   a coil diameter of the pair of transmitting coil and receiving coil on the first chip is the same as a coil diameter of the pair of transmitting coil and receiving coil on the second chip.

7. The information processing apparatus according to claim 6, wherein:
   the transmitting coil and the receiving coil are formed on different layers of one of the plurality of chips.

8. The information processing apparatus according to claim 1, wherein:
   the inner area of the one of the plurality of chips is 80% or more of an area of the one of the plurality of chips.

9. The information processing apparatus according to claim 1, wherein:
   a seal ring is formed on each of the plurality of chips, and a part of the seal ring is divided.

10. The information processing apparatus according to claim 9, wherein:
    a thickness of the seal ring is 2 µm or less.

11. The information processing apparatus according to claim 1, wherein:
    a power ring is formed on each of the plurality of chips, and
    a distance between the pair of transmitting coil and receiving coil and the power ring is 150 µm or more.

12. The information processing apparatus according to claim 1, wherein:
    one of the plurality of chips is a CPU (Central Processing Unit).

13. The information processing apparatus according to claim 1, wherein:
    one of the plurality of chips is a memory.

14. The information processing apparatus according to claim 1, wherein:
- a hardware configuring the information processing apparatus is configured of one or more chips among the plurality of chips.

15. The information processing apparatus according to claim 14, wherein:
- the hardware is a CPU (Central Processing Unit).

16. The information processing apparatus according to claim 1, wherein:
- the plurality of chips are horizontally integrated.

17. The information processing apparatus according to claim 1, wherein:
- the plurality of chips are horizontally integrated on a substrate,
- the first chip is located directly adjacent to the second chip, and
- an extending direction of the first chip is inclined to an extending direction of the second chip.

18. The information processing apparatus according to claim 1, wherein:
- each coil of the pair of transmitting coil and receiving coil is ring-shaped, and
- the inner area of the one of the plurality of chips is surrounded by each coil of the pair of transmitting coil and receiving coil.

19. The information processing apparatus according to claim 9, wherein:
- the seal ring is located closer to the periphery of one of the plurality of chips than the pair of transmitting coil and receiving coil.

20. The information processing apparatus according to claim 11, wherein:
- the power ring is located in an enclosed area of one of the plurality of chips, and
- the enclosed area is surrounded by the pair of transmitting coil and receiving coil.

* * * * *